(12) United States Patent
Moriyama et al.

(10) Patent No.: US 8,052,113 B2
(45) Date of Patent: Nov. 8, 2011

(54) SEAT SLIDE APPARATUS FOR VEHICLE

(75) Inventors: Genta Moriyama, Anjo (JP); Mikihito Nagura, Okazaki (JP); Taku Harada, Nisshin (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 97 days.

(21) Appl. No.: 12/726,625

(22) Filed: Mar. 18, 2010

(65) Prior Publication Data

US 2010/0243853 A1    Sep. 30, 2010

(30) Foreign Application Priority Data

Mar. 30, 2009 (JP) ................................. 2009-082612

(51) Int. Cl.
*F16M 13/00* (2006.01)
*B60N 2/08* (2006.01)
(52) U.S. Cl. ...... 248/430; 248/424; 248/429; 296/65.13
(58) Field of Classification Search .................. 248/430, 248/429, 424; 296/65.13
See application file for complete search history.

(56) References Cited

U.S. PATENT DOCUMENTS

| 6,869,057 B2 * | 3/2005 | Matsumoto et al. ......... 248/430 |
| 7,665,791 B2 | 2/2010 | Kojima et al. |
| 7,717,490 B2 * | 5/2010 | Kojima et al. ............ 296/65.13 |
| 7,963,496 B2 * | 6/2011 | Kojima et al. ................ 248/429 |
| 2009/0314916 A1 * | 12/2009 | Kojima et al. ................ 248/429 |
| 2010/0090082 A1 * | 4/2010 | Kojima et al. ................ 248/429 |

FOREIGN PATENT DOCUMENTS

| JP | 2000-38063 | 2/2000 |
| JP | 2005-41418 | 2/2005 |
| JP | 2008-279806 | 11/2008 |
| WO | WO 2007/129435 A1 | 11/2007 |

* cited by examiner

*Primary Examiner* — Anita M King
(74) *Attorney, Agent, or Firm* — Oblon, Spivak, McClelland, Maier & Neustadt, L.L.P.

(57) ABSTRACT

A seat slide apparatus for a vehicle includes a cushioning member provided at one of an operational lever and a lock lever. The cushioning member is configured to contact the other of the operational lever and the lock lever for restricting a contact of an end portion of the operational lever with the lock lever at an initial stage of the rotational operation of the operational lever and is configured to allow a contact of the end portion of the operational lever with the lock lever when canceling the restriction of the movement of an upper rail relative to a lower rail by the lock lever in response to the rotational operation of the operational lever.

4 Claims, 4 Drawing Sheets

SEAT SLIDE APPARATUS FOR VEHICLE

CROSS REFERENCE TO RELATED APPLICATIONS

This application is based on and claims priority under 35 U.S.C. §119 to Japanese Patent Application 2009-082612, filed on Mar. 30, 2009, the entire content of which is incorporated herein by reference.

TECHNICAL FIELD

This disclosure relates to a seat slide apparatus for a vehicle.

BACKGROUND DISCUSSION

Known seat slide apparatuses for a vehicle are, for example, disclosed in JP2000-38063A, JP2008-279806A, and JP2005-41418A (hereinafter referred to as Patent reference 1, Patent reference 2, and Patent reference 3, respectively). The known seat slide apparatuses include lower rails and upper rails connected to the lower rails, respectively, to be movable relative to the lower rails. A lock lever, which selectively restricts the movement of the upper rail relative to the lower rail by engaging with the lower rail, is rotatably connected to the upper rail. Further, an operational lever, which is configured to transmit an operational force to the lock lever to cancel the restriction of the movement of the upper lever, is rotatably connected to the upper rail. That is, an end of the operational lever is in contact with the lock lever, and upon the rotation of the operational lever in response to the operation of the operational lever, the lock lever is pressed by the end of the operational lever, thereby canceling the restriction of the movement of the upper lever.

Further, according to the disclosures in Patent references 1 to 3, a cushioning member is provided between the operational lever and a support portion which serves as a rotational axis of the operational lever to restrain a generation of noises therebetween.

With the constructions of known seat slide apparatuses for the vehicle disclosed in Patent references 1 to 3, the looped shaped operational lever having end portions which are configured to contact the lock levers, each provided at both sides of a seat, respectively, for simultaneously unlocking the both lock levers. In those circumstances, there is a possibility that one of the end portions of the operational lever is not in contact with the lock lever because of variations when assembled, or the like. In that case, noises may be generated by a contact of the end of the lock lever which has not been in contact with the lock lever and the lock lever with an impact because of vehicle oscillation, or the like.

The generation of the noise may be restrained by providing a cushioning member between the end portion of the operational lever and the lock lever similar to the aforementioned construction between the operational lever and the support portion. However, according to this construction, the cushioning member constantly contacts an opposite member (i.e., the end of the operational lever or the lock lever) during the operation of the lock lever in response to the operation of the operational lever (i.e., when the restriction of the movement of the upper rail is canceled). Further, because the operational lever and the lock lever are not coaxially arranged, contact portions between the cushioning member and the opposite member vary in response to proceeding of the operation. That is, the cushioning member is likely to be deteriorated by constantly contacting the opposite member, and there is a risk that effects for restraining the noise may decline with time and usage. Particularly, in a case where an operational direction of the operational lever and an operational direction of the lock lever differ from each other (e.g., rotational axes of the operational lever and the lock lever are orthogonally arranged from each other), the effects for restraining the noise may drastically decline.

A need thus exists for a seat slide apparatus for a vehicle which is not susceptible to the drawback mentioned above.

SUMMARY

In light of the foregoing, the disclosure provides a seat slide apparatus for a vehicle, which includes a lower rail adapted to be fixed to a vehicle floor, an upper rail adapted to be fixed to the seat for moving relative to the lower rail, a lock lever rotatably connected to the upper rail and configured to be engaged with the lower rail for selectively restricting a movement of the upper rail relative to the lower rail, a first biasing member for elastically retaining the lock lever at a predetermined initial position where the movement of the upper rail relative to the lower rail is restricted, an operational lever rotatably connected to the upper rail and operationally connected to the lock lever, the operational lever having an end portion which is configured to transmit an operational force of the operational lever to the lock lever for canceling the restriction of the movement of the upper rail relative to the lower rail in response to a rotational operation of the operational lever, a second biasing member for elastically retaining the operational lever at a predetermined initial position, and a cushioning member provided at one of the operational lever and the lock lever, the cushioning member being configured to contact the other of the operational lever and the lock lever for restricting a contact of the end portion of the operational lever with the lock lever at an initial stage of the rotational operation of the operational lever and being configured to allow a contact of the end portion of the operational lever with the lock lever when canceling the restriction of the movement of the upper rail relative to the lower rail by the lock lever in response to the rotational operation of the operational lever.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Embodiments of the seat slide apparatus for the vehicle will be explained with reference to illustrations of drawing figures as follows.

Figure 1:
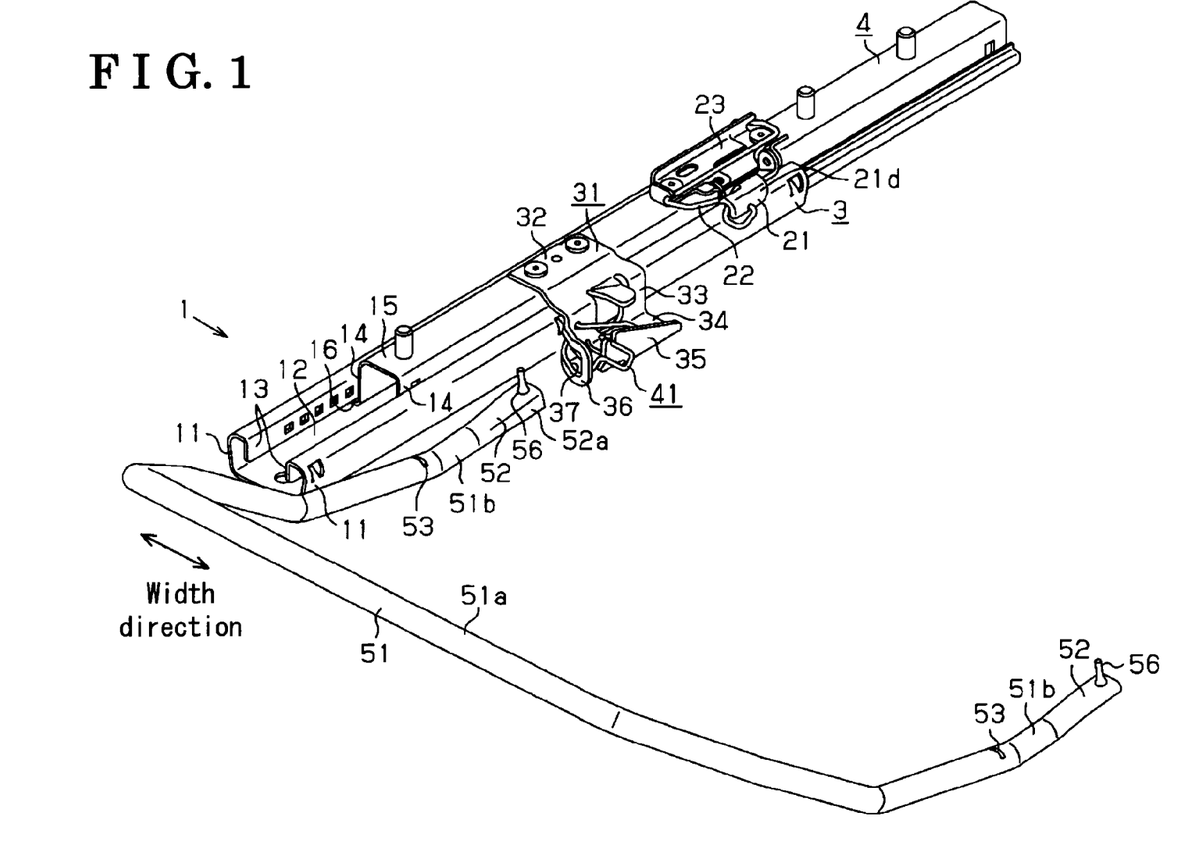
FIG. 1 is a perspective view of a seat slide apparatus for a vehicle according to a first embodiment disclosed here.

As shown in FIG. 1, a seat slide apparatus 1 for a vehicle includes a lower rail 3 which is arranged to extend in a front-rear direction of the vehicle and is fixed to a vehicle floor. An upper rail 4 is attached to the lower rail 3 to be movable relative to the lower rail 3. For an explanatory purpose, only a single set of the upper rail and the lower rail is shown in the drawings. However, according to the embodiments, two sets of the upper rail and the lower rail serving as a pair are provided. Hereinafter, directions, such as "width direction", "upward", "downward", "front", "rear", or the like, correspond to an orientation of the vehicle.

Figure 4:
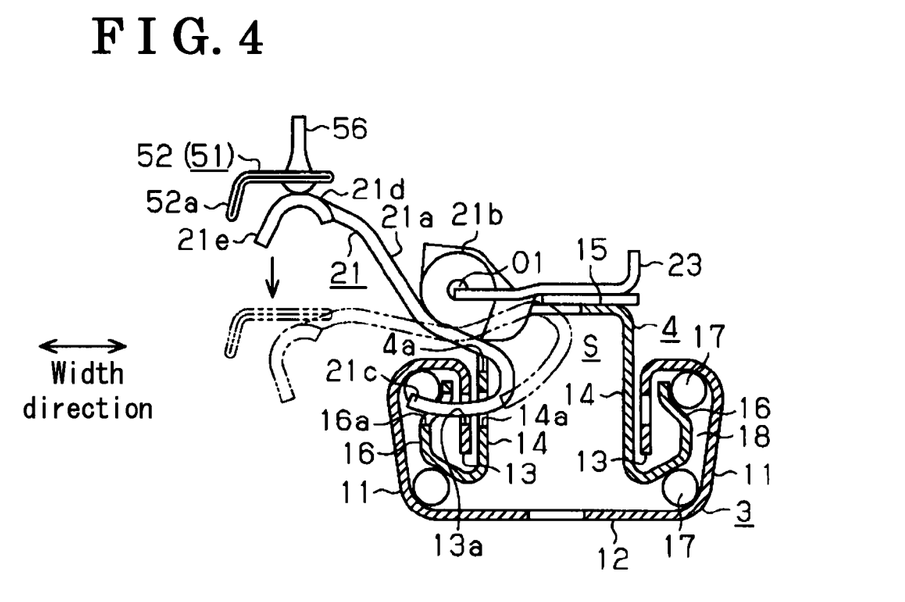
FIG. 4 is a cross-sectional view of the seat slide apparatus for the vehicle taken on line IV-IV of FIG. 3.

As shown in FIG. 4, the lower rail 3 includes side wall portions 11, 11 which are provided upright at both sides thereof in a width direction and serve as a pair, and a bottom wall portion 12 connecting base ends (i.e., bottom ends) of the side wall portions 11, 11. A folded wall portion 13 is provided at a top end of each of the side wall portions 11, 11. The folded wall portion 13 is formed continuously from the top end of the side wall portion 11 to extend inwardly in the width direction and is bent to further extend towards the base end of the side wall portion 11 in a downward direction.

The upper rail 4 includes side wall portions 14, 14 which extend in an upward-downward direction between the folded wall portions 13, 13 of the lower rail 3 and serve as a pair, and a cover wall portion 15 connecting base ends (i.e., top ends) of the side wall portions 14, 14. A folded wall portion 16 is provided at a bottom end of each of the side wall portions 14, 14. The folded wall portion 16 is formed continuously from the bottom end of the side wall portion 14 to extend outwardly in the width direction and is bent to further extend upwardly to be enclosed by the side wall portion 11 and the folded wall portion 13.

That is, the lower rail 3 and the upper rail 4 are formed in configurations each having a U-shaped cross section and openings of the lower rail 3 and the upper rail 4 face each other. Disassembling of the lower rail 3 and the upper rail 4 from each other in an upward-downward direction is prevented mainly by the engagement of the folded wall portion 13 and the folded wall portions 16. The cross sections of rails of the lower rail 3 and the upper rail 4 are rectangularly shaped. The lower rail 3 and the upper rail 4 form a space S therebetween.

A retainer 18 retaining balls 17, 17 which are arranged in parallel to each other in an upward-downward direction is provided between each of the folded wall portions 16 and the side wall portion 11 provided facing the folded wall portion 16. The upper rail 4 is supported slidably in a longitudinal direction (a front-rear direction of the vehicle) relative to the lower rail 3 in a manner that the balls 17 rolls between the upper rail 4 and the lower rail 3.

Plural lock holes 13a are formed on at least one of the folded wall portions 13 of the lower rail 3 to be arranged at predetermined intervals over an approximately entire length of the lower rail 3 in the longitudinal direction thereof (i.e., a direction perpendicular to the drawings). A penetration hole 4a is formed on the upper rail 4 at a center portion in the longitudinal direction thereof. The penetration hole 4a is formed by cutting out a corner portion of the upper rail 4 formed by a portion of the cover wall portion 15 and a portion of one of the side wall portions 14 (see the side wall portion 14 provided at the left side in FIG. 4). Plural holes 14a are formed on a bottom portion of the side wall portion 14 at predetermined intervals within a range corresponding to a range of the penetration hole 4a in the longitudinal direction. Further, plural holes (e.g., the same number with the number of the hole 14a) 16a are formed on the folded wall portion 16 which is formed continuously from the side wall portion 14 at predetermined intervals. The plural holes 14a and 16a are arranged at positions where the holes 14a and 16a face each other. Further, the plural holes 14a and 16a are configured to face, or to be compatible with lock holes 13a (e.g., the same number with the number of the hole 14a and the hole 16a) which are formed on the lower rail 3 adjacent to one another in a longitudinal direction of the lower rail 3. In other words, the intervals of the plural holes 14a and 16a correspond to the interval of the lock holes 13a which are arranged adjacent to one another.

Figure 2:
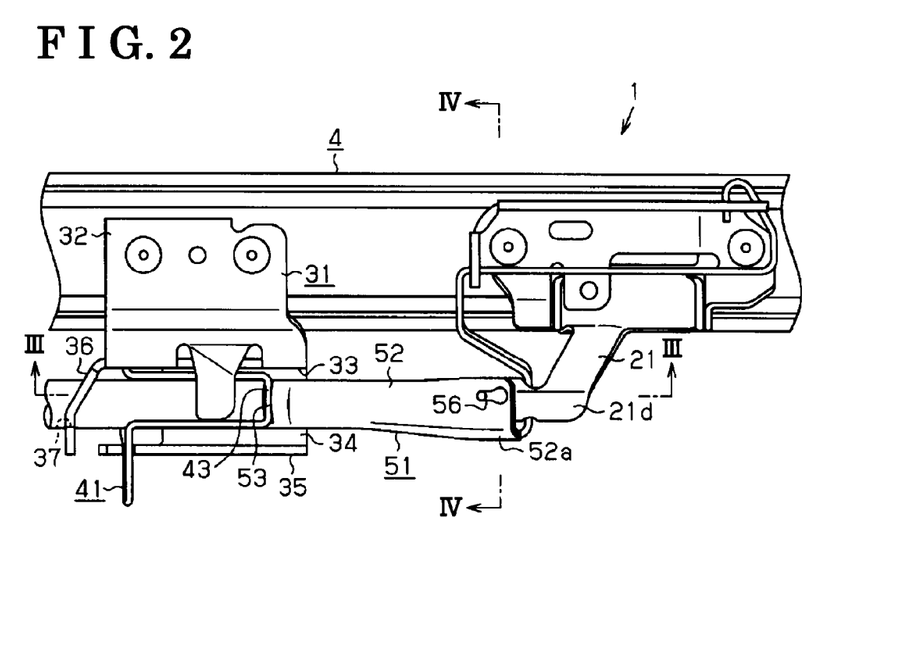
FIG. 2 is a plane view of the seat slide apparatus for the vehicle according to the first embodiment disclosed here.

A lock lever 21 made from a plate is rotatably connected to the upper rail 4 via a bracket 23 within a range of the penetration hole 4a in the longitudinal direction. The lock lever 21 includes a body portion 21a which is shaped in a plane plate form and a pair of supporting pieces 21b which are bent in an upward direction from both ends of the bottom portion of the body portion 21a in the longitudinal direction of the upper rail 4 (i.e., a direction orthogonal to FIG. 4). The lock lever 21 is supported by the supporting pieces 21b, 21b to be rotatable about a rotational axis O1 which extends in a longitudinal direction of the upper rail 4 outside the space S. Further, the lock lever 21 includes plural lock pawls 21c (e.g., the same number with the number of the hole 14a; the number of the hole 14a is determined to be equal to or greater than the number of the lock pawl 21c) which are formed at the body portion 21a and arranged to enter the space S via the penetration hole 4a. Further, the plural lock pawls 21c are formed so as to fold outwardly from the space S (i.e., left side in FIG. 2). The lock pawls are formed at predetermined intervals. The lock pawl 21c is configured to be selectively inserted into and removed from the holes 14a, 16a in response to the rotation of the lock lever 21 about the rotational axis O1.

In those circumstances, when the lock pawl 21c is inserted into the holes 14a, 16a and the lock hole 13a, the relative movement of the lower rail 3 and the upper rail 4 is restricted. When the lock pawl 21c is removed from the hole 16a, the lock hole 13a, and the hole 14a consecutively, the relative movement of the lower rail 3 and the upper rail 4 is allowed.

Further, the lock lever 21 includes a bent portion 21e which is formed at an end of the body portion 21a and is curved to slant in a downward direction. The lock lever 21 includes a contact portion 21d at a top surface of the bent portion 21e (i.e. a curved surface at a border between the body portion 21a and the bent portion 21e).

As shown in FIG. 1, a torsion wire 22 serving as a first biasing member is provided at a top portion of the upper rail 4. A first end of the torsion wire 22 is engaged with the lock lever 21 and a second end of the torsion wire 22 is engaged with the bracket 23. The lock lever 21 is constantly biased by the torsion wire 22 in a rotational direction by which the lock pawl 21c is inserted into the holes 13a, 14a, and 16a (i.e., in the clockwise direction in FIG. 4), and is elastically retained at a predetermined initial position.

The seat slide apparatus 1 for the vehicle includes the lower rails 3, the upper rails 4, the lock levers 21, and the torsion wires 22, or the like, which are arranged at both sides in a vehicle seat width direction as a pair. A seat serving as a seating portion of an occupant is fixed to the upper rails 4, 4 to be supported. Thus, when the movement of the upper rails 4, 4 relative to the lower rails 3, 3 is restricted by the engagement of the lock pawls 21c, 21c of the lock levers 21, 21 and the lock holes 13a, 13a of the lower rails 3, 3, the seat is retained at a predetermined position relative to the vehicle floor. On the other hand, when the restriction of the movement of the upper rails 4, 4 relative to the lower rails 3, 3 is canceled by the disengagement of the lock pawls 21c, 21c of the lock levers 21, 21 and the lock holes 13a, 13a of the lower rails 3, 3, the seat is allowed to adjust the position of the upper rails 4, 4 relative to the vehicle floor in the longitudinal direction (i.e., the front-rear direction of the vehicle).

As shown in FIG. 1, a support bracket 31 which is made from a plate is fixed to each of the upper rails 4, 4 at one side relative to the lock lever 21 in the longitudinal direction (bottom left side in FIG. 1). The support bracket 31 includes an attaching wall portion 32 which extends in a width direction of the upper rail 4 to be fastened to the cover wall portion 15, and a first side wall portion 33 which extends downward from an end of the attaching wall portion 32 in a state where the first side wall portion 33 covers the side wall portion 11 which is arranged facing the opposing lower rail 3. The support bracket 31 includes a bottom wall portion 34 which extends outwardly from a bottom end of the first side wall portion 33 in a width direction of the lower rail 3, and a second side wall portion 35 which is formed in a triangular shape and extends upwardly from an end of the bottom wall portion 34. The support bracket 31 further includes a support wall portion 36 which extends from one side of the first side wall portion 33 (a side shown at bottom left side in FIG. 1) outwardly in the width direction of the lower rail 3. A rectangular shaped insertion hole 37 which opens in the longitudinal direction of the upper rail 4 is formed on the support wall portion 36.

A torsion spring 41 serving as a second biasing member is provided at the support bracket 31. A first end of the torsion spring 41 is engaged with the first side wall portion 33 and a second end of the torsion spring 41 is engaged with the second side wall portion 35. The torsion spring 41 applies a downward biasing force, which has a fulcrum at the first and second end portions of the torsion spring 41, to an extended portion 43 (see FIG. 2) formed in a U-shape between the first and the second end portions.

As shown in FIG. 1, an operational lever 51 which is formed by bending a pipe member is configured to be connected to each of the support brackets 31 provided at each side of the seat in the width direction. Namely, the operational lever 51 includes an operational portion 51a which extends in the width direction of the seat and end portions 51b, 51b each serving as a lever portion which are bent in the longitudinal direction of the upper rail 4 towards the corresponding lock levers 21, 21 respectively. The operational lever 51 integrally includes the end portions 51b, 51b. The operational lever 51 further includes a pressed portion 52, at end portions thereof, which is formed by pressing each of the end portions 51b, 51b in an upward-downward direction to have a plate configuration. An inner side of each of the pressed portions 52, 52, in the width direction of the seat, which are arranged facing each other is formed to have a slant which slants in a downward direction closer to bottom end thereof, which is formed as a restriction portion 52a. The restriction portions 52a, 52a are provided symmetrically in the width direction of the seat. The operational lever 51 further includes a retaining slit 53 which is formed on a top portion of a base end portion of each of the pressed portions 52, 52 in a width direction of the rail. The retaining slit 53 extends in a direction which is orthogonal to an inserting direction of the operational lever 51 (i.e., a penetrating direction of the insertion hole 37).

The end portion 51b of the operational lever 51 is inserted into the insertion hole 37 of the support wall portion 36 (support bracket 31) along the longitudinal direction of the upper rail 4 so that the operational lever 51 is supported by the support wall portion 36. Further, the operational lever 51 is operationally connected to the lock lever 21 by positioning the pressed portion 52 on the corresponding contact portion 21d of the lock lever 21 (see FIG. 4). In those circumstances, the extended portion 43 of the torsion spring 41 is fitted into the retaining slit 53 so that the end portion 51b of the operational lever 51 is engaged and prevented from being disengaged in a state where a top portion of the end portion 51b of the operational lever 51 is biased in a downward direction.

Figure 3:
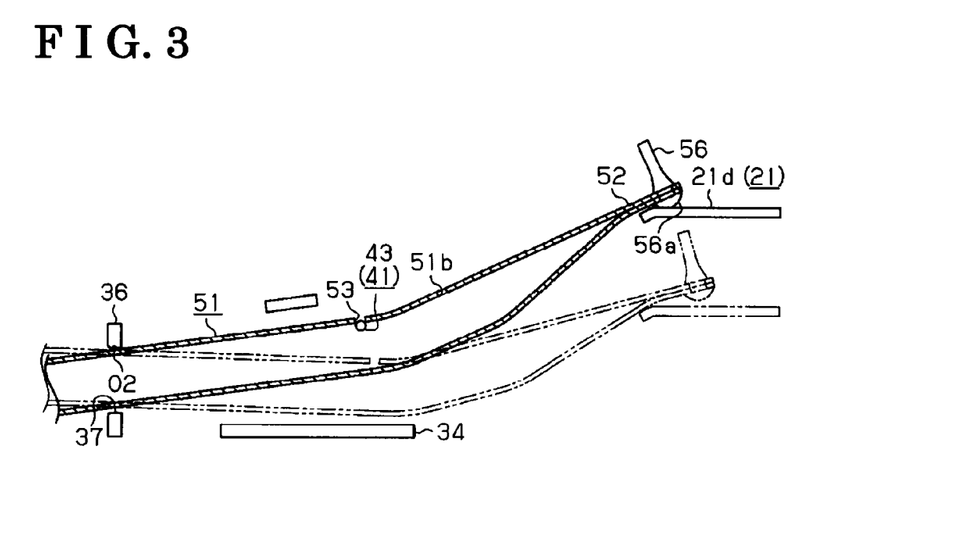
FIG. 3 is a cross-sectional view of the seat slide apparatus for the vehicle taken on line III-III of FIG. 2.

As shown in FIG. 3, the support wall portion 36 (insertion hole 37) serves as a fulcrum of a rotation of the operational lever 51 at a portion which contacts a top portion of each of the end portions 51b, 51b of the operational lever 51 (i.e., hereinafter referred to as the contact portion). Accordingly, the support wall portion 36 supports the operational lever 51 to be rotatable about a rotational axis O2 which is defined at the contact portion of the support wall portion 36 and the operational lever 51 (i.e., the top portion of the end portion 51b). The fulcrum of the rotation of the operational lever 51 is set using the support bracket 31 (support wall portion 36) to set an operational force and an operational amount of the operational lever 51 which is required for unlocking the lock lever 21 by leverage. In those circumstances, the rotational direction (rotational axis O2) of the operational lever 51 and the rotational direction (rotational axis O1) of the lock lever 21 are different from one another. The torsion spring 41 is configured to elastically retain the operational lever 51 at a predetermined initial position so as to maintain a linked state of the operational lever 51 and the lock lever 21.

A cushioning member 56 formed in a pin shape and made of, for example, rubber or resin is secured to the pressed portion 52 of the operational lever 51. The cushioning member 56 includes a semispherical cushioning portion 56a which is configured to elastically contact or to be approximate to the contact portion 21d of the lock lever 21 which is retained at the predetermined initial position by the torsion wire 22 when the operational lever 51 is retained at the predetermined initial position by the torsion spring 41. The lock lever 21 and the operational lever 51 are arranged so that the contact portion 21d and the pressed portion 52 do not directly contact each other in a state where the cushioning portion 56a is in contact with the contact portion 21d without the operation of the lock lever 21. Thus, at an initial stage of rotational operation of the operational lever 51, the contact of the pressed portion 52 with the contact portion 21d is restricted by the cushioning member 56 which is in contact with the contact portion 21d of the lock lever 21.

On the other hand, when the lock lever 21 starts operating (rotating about the rotational axis O1) against the biasing force of the torsion wire 22 in response to the rotational operation of the operational lever 51, the pressed portion 52 is configured to contact the contact portion 21d of the lock lever 21 at a portion closer to the base end portion relative to the cushioning member 56. In those circumstances, the cushioning member 56a is gradually separated from the contact portion 21d in accordance with the proceeding of the operation of the lock lever 21. As shown in FIG. 3 with a double-dash chain line, when the restriction of the movement of the lock lever 21 is canceled in response to the rotational operation of the operational lever 51, the cushioning member 56 is separated from the contact portion 21d to allow a direct contact of the pressed portion 52 and the lock lever 21. Thus, in the foregoing state, the operational force of the operational lever 51 is transmitted between the pressed portion 52 and the lock lever 21 and the transmission of the operational force of the operational lever 51 between the cushioning member 56 and the lock lever 21 is canceled. According to the foregoing construction, the sliding contact between the cushioning member 56 and the lock lever 21 is not constant when releasing the restriction of the movement of the lock lever 21, and the deterioration (friction, or the like) of the cushioning member 56 because of the sliding contact therebetween is restrained. Further, because the sliding contact between the cushioning member 56 and the lock lever 21 is canceled when the greater force by the rotation of the operational lever 51 is applied so that the operational force is transmitted by the direct contact between the pressed portion 52 and the lock lever 21, the deterioration of the cushioning member 56 is restrained.

An operation of the seat slide apparatus 1 according to the embodiment will be explained hereinafter. When the relative movement of the lower rail 3 relative to the upper rail 4 is restrained by the lock lever 21 (i.e., the restricted state of the relative movement), the operational lever 51 is retained at the predetermined initial position by the torsion spring 41, and the lock lever 21 is retained at the predetermined initial position by the torsion wire 22. When the operational lever 51 swings, for example, by the vehicle oscillation, the cushioning member 56 and the contact portion 21d elastically contact each other (or, the contact state is maintained between the cushioning member 56 and the contact portion 21d), and a direct contact between the contact portion 21d and the pressed portion 52 is restrained. Accordingly, a generation of a noise such as hitting sound generated between the pressed portion 52 and the lock lever 21 is restrained.

On the other hand, when the operational lever 51 is operated by raising the operational portion 51a so that the end portions 51b, 51b of the operational lever 51 rotate about the rotational axis O2 in the clockwise direction in FIG. 3, each of the pressed portions 52, 52 of the operational lever 51 moves downward in FIG. 3 so as to press the corresponding contact portion 21d of the lock lever 21 in the downward direction via the cushioning member 56 at this stage. In response to the pressing operation of the pressed portion 52 to push the contact portion 21d in the downward direction, the lock lever 21 rotates against the biasing force of the torsion wire 22 about the rotational axis O1 in the counterclockwise direction in FIG. 4, that is, in a rotational direction to remove the lock pawl 21c from the holes 13a, 14a, 16a. Thereafter, as the operation of the lock lever 21 further proceeds, the pressed portion 52 comes to directly press the contact portion 21d and the cushioning member 56 gradually separates from the contact portion 21d. Then, in accordance with a further proceeding of the operation of the lock lever 21, the restriction of the relative movement between the lower rail 3 and the upper rail 4 is canceled.

When the operational force of the operational lever 51 (operational portion 51a) is released, the lock lever 21 is biased by the torsion wire 22 to rotate about the rotational axis O1 in the clockwise direction in FIG. 4, that is, the lock lever 21 rotates in a direction so that the lock pawl 21c is inserted into the holes 13a, 14a, and 16a (i.e., returning rotation). Accordingly, the relative movement of the lower rail 3 and the upper rail 4 is restricted again. The end portions 51b, 51b of the operational lever 51 rotate about the rotational axis O2 in the counterclockwise direction in FIG. 3 in cooperation with the lock levers 21, 21.

As explained above, the pressed portion 52 of the operational lever 51 includes the restriction portion 52a which is positioned at the inner side in the width direction of the seat so that each of the restriction portions 52a, 52a are arranged to face each other. Accordingly, even when the operational lever 51 is to move in one of the directions in the width direction of the seat relative to the lock lever 21, one of the restriction portions 52a positioned at the side corresponding to the width direction that the operational lever 51 is to move comes to be engaged with the bent portion 21e of the lock lever so as to restrict the movement. Accordingly, the cancellation of the restricted state of the relative movement of the lower rail 3 and the upper rail 4 by the lock lever 21 by the operation of the operational lever 51 can be performed more stably. Further, because the pressed portion 52 includes the restriction portion 52a, the rigidity of the end of the operational lever 51 is enhanced.

According to the above-explained embodiment, the following advantages and effects can be attained. First, according to the construction of the seat slide apparatus 1 for the vehicle, the cushioning member 56 contacts the lock lever 21 (i.e., contact portion 21d) at the initial stage of the rotational operation of the operational lever 51 to restrict the contact between the operational lever 51 and the pressed portion 52. Thus, even when the operational lever 51 which is elastically retained at the predetermined initial position swings, for example, by the vehicle oscillation, the cushioning member 56 restricts the contact of the pressed portion 52 of the operational lever 51 and the lock lever 21. Accordingly, a generation of a noise such as hitting sound generated between the pressed portion 52 and the lock lever 21 can be restrained. In those circumstances, because the cushioning member 56 and the lock lever 21 elastically contact each other, the generation of the noise therebetween is restrained. On the other hand, at the cancellation of the restricted state of the relative movement of the lower rail 3 and the upper rail 4 by the lock lever 21 in accordance with the rotational operation of the operational lever 51, the cushioning member 56 is separated from the lock lever 21 and the contact between the pressed portion 52 and the lock lever 21 is allowed. That is, at the cancellation of the restricted state of the relative movement of the lower rail 3 and the upper rail 4 by the lock lever 21, the operational force is transmitted between the pressed portion 52 and the lock lever 21 and the operational force is not transmitted between the cushioning member 56 and the lock lever 21. Further, the further the operational lever 51 is rotated to cancel the restriction of the relative movement between the lower rail 3 and the upper rail 4, the higher the pressure transmitted from the pressed portion 52 to the lock lever 21 becomes. Thus, the cushioning member 56, the pressed portion 52 of the operational lever 51, and the lock lever 21 are arranged so that the cushioning member 56 is separated from the lock lever 21 and the pressed portion 52 and the lock lever 21 directly contact each other when the higher pressure is applied. Accordingly, even if the cushioning member 56 and the lock lever 21 slidingly contact each other, for example, when canceling the restricted state of the relative movement of the lower rail 3 and the upper rail 4 by the lock lever 21, the deterioration of the cushioning member 56 can be restrained and the reduction of the noise restraining effects when using the seat slide apparatus can be restrained.

According to the construction of the embodiment, by rotating the end portions 51b, 51b in response to the operation of the operational portion 51a, the operational lever 51 simultaneously transmits the operational force to both of the lock levers 21, 21 to cancel the restriction of the relative movement of the lower rail 3 and the upper rail 4. Further, in those circumstances, even if one of the pressed portions 52 of the operational lever 51 is in contact with the lock lever 21, there is a possibility that the other pressed portion 52 is not in contact with the lock lever 21 due to the influence of the variations when assembled. Even if one of the pressed portions 52 is not in contact with the lock lever 21, because the cushioning member 56 is provided, higher effects of restraining the noise can be attained both when the operational lever 51 is provisioned at the predetermined initial position and when the operational lever 51 is positioned at the position to unlock the lock levers 21, 21 to cancel the restriction of the relative movement of the lower rail 3 and the upper rail 4.

Further, according to the construction of the seat slide apparatus 1 of the embodiment, when the operational lever 51 is about to be displaced in one of the directions in the width direction of the operational lever 51, the displacement of the operational lever 51 in the width direction of the seat is restricted by the engagement of the restriction portion 52a of the end portion 51b with the lock lever 21. Accordingly, the cancellation of the restricted state of the relative movement of the lower rail 3 and the upper rail 4 by the lock lever 21 in response to the operation of the operational lever 51 can be performed more stably.

Further, according to the seat slide apparatus 1 for the vehicle of the embodiment, the pressed portion 52 of the operational lever 51 includes the restriction portion 52a, which enhances the rigidity thereof by an increase of the geometrical moment of inertia.

Figure 5:
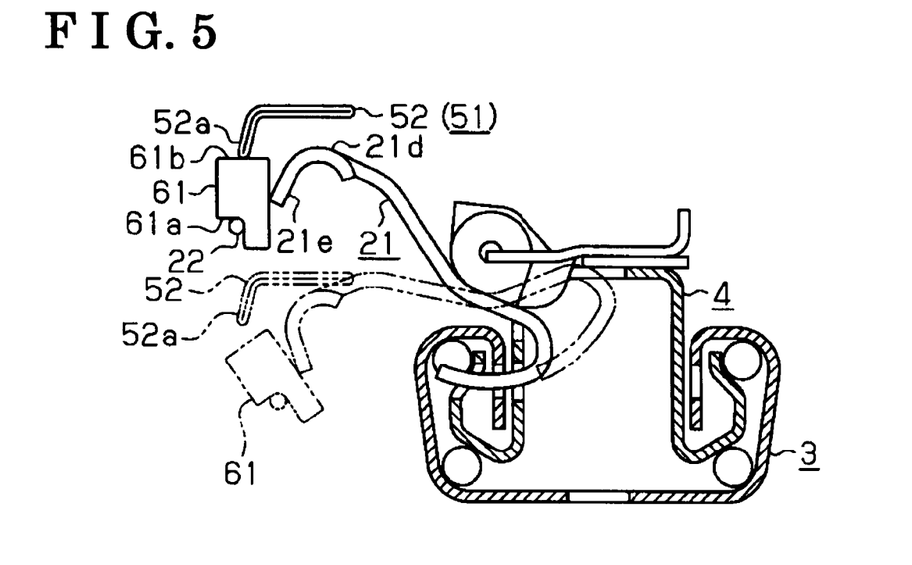
FIG. 5 is a lateral cross-sectional view of a seat slide apparatus for a vehicle according to a second embodiment disclosed here.

A second embodiment of the seat slide apparatus for the vehicle will be explained with reference to FIG. 5 as follows. As shown in FIG. 5, instead of the cushioning member 56 disclosed in the first embodiment, a cushioning member 61 provided at the lock lever 21 may serve as the cushioning member. The construction of the cushioning member of the second embodiment is different from the construction of the cushioning member of the first embodiment, and other constructions of the seat slide apparatus 1 for the vehicle according to the second embodiment are similar to the first embodiment and thus the explanations are not repeated. The cushioning member 61 made of, for example, rubber or resin is formed in a block shape which has a cut out portion 61a at a bottom portion at one side in the width direction of the seat (i.e., the side which faces the other lock lever 21). The cushioning member 61 which is positioned at the bent portion 21e of the lock lever 21 is retained by an end portion of the torsion wire 22 which is engaged with the lock lever 21 in a state where a folded portion of the end portion of the torsion wire 22 which is engaged with the lock lever 21 is hooked at the cut out portion 61a. The cushioning member 61 is configured, at a top surface 61b thereof, to elastically contact or to be approximate to a bottom end of the restriction portion 52a of the operational lever 51 which is retained at the predetermined initial position by the torsion spring 41 when the lock lever 21 is retained at the predetermined initial position by the torsion wire 22. In a state where the restriction portion 52a is in contact with the cushioning member 61 without the operation of the lock lever 21, the operational lever 51 and the lock lever 21 are configured so that the pressed portion 52 and the contact portion 21d do not directly contact each other. Thus, the contact of the pressed portion 52 and the contact portion 21d is restricted by the contact of the restriction portion 52a to the cushioning member 61 at the initial stage of the rotational operation of the operational lever 51.

On the other hand, as indicated with a double-dash chain line in FIG. 5, when canceling the restricted state of the relative movement of the lower rail 3 and the upper rail 4 by the lock lever 21 in response to the rotation of the operational lever 51, the cushioning member 61 is separated from the restriction portion 52a to allow a direct contact of the pressed portion 52 and the lock lever 21. Accordingly, in the foregoing state, the operational force of the operational lever 51 is transmitted between the pressed portion 52 and the lock lever 21, and the transmission of the operational force of the operational lever 51 between the cushioning member 61 and the lock lever 21 is not performed. According to the construction of the second embodiment, advantages and effects similar to those of the first embodiment are attained.

Figure 6:
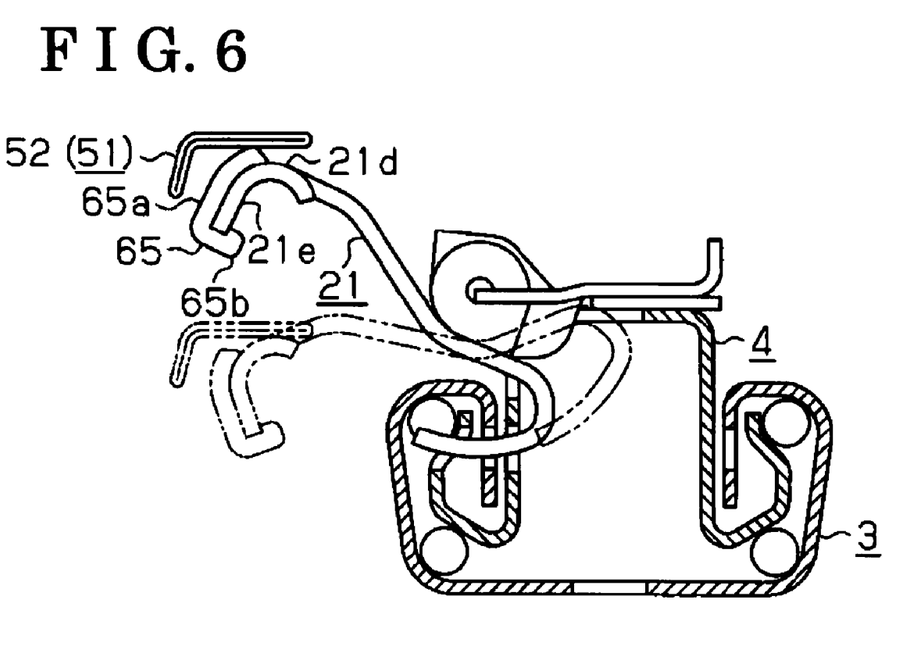
FIG. 6 is a plane view of a seat slide apparatus for a vehicle according to a third embodiment disclosed here.

A third embodiment of the seat slide apparatus for the vehicle will be explained with reference to FIG. 6 as follows. As shown in FIG. 6, instead of the cushioning member 56 disclosed in the first embodiment, a cushioning member 65 which is provided at the lock lever 21 with another connecting construction may be applied as the cushioning member. Constructions related to the cushioning member 65 are different from the constructions of the first embodiment, and other constructions of the third embodiment are similar to those of the first embodiment and thus the explanations are not repeated. The cushioning member 65 made of rubber or resin includes a cushioning portion 65a which is tightly attached to an external side surface of the bent portion 21e and an engaging pawl 65b which is integrally formed with the cushioning portion 65a by bending a bottom end of the cushioning portion 65a to enclose a bottom end portion of the bent portion 21e. According to the construction of the third embodiment, advantages and effects similar to those of the first embodiment are attained.

With respect to the first to third embodiments, when canceling the restricted state of the relative movement of the lower rail 3 and the upper rail 4 by the lock lever 21 in response to the rotation of the operational lever 51, the cushioning member 56, 61, 65 is not necessarily separated from the opposite member (i.e., the lock lever 21 or the pressed portion 52) as long as at least part of the operational force is transmitted between the pressed portion 52 and the lock lever 21 by allowing the contact of the pressed portion 52 with the lock lever 21. Even if the construction is changed to the foregoing manner, when canceling the restricted state of the relative movement of the lower rail 3 and the upper rail 4 by the lock lever 21, the transmission of the operational force between the cushioning member and the opposite member can reduced, and thus the deterioration of the cushioning member can be restrained.

According to the embodiments, for example, a leaf spring and a coil spring, or the like, may be applied as the biasing members of the lock lever 21 and the operational lever 51. Further, according to the embodiments, the number of the lock pawls 21c provided at the lock lever 21 may be one or more (at least one).

One example of the cross sectional configuration of the lower rail 3 is disclosed in the embodiments, and the configurations of the lower rail 3 may be varied. For example, the folded wall portion 13 of the lower rail 3 may be folded to extend outwardly in the width direction of the rail. Further, the configuration of the cross section of the upper rail 4 in the embodiments is just an example, and the configurations of the upper rail 4 may be varied. For example, the folding wall potion 16 of the upper rail 4 may be folded to extend inwardly in the width direction of the rail. Further, the configuration of the cross section of the rail of the upper rail 4 is not limited to the U shape, and the configurations of the upper rail 4 may be varied. For example, an inverted T-shape may be applied to a cross-sectional configuration of the upper rail 4.

A moving direction of the seat in response to the movement of the upper rail 4 relative to the lower rail 3 may be varied, for example, in a front-rear direction of the vehicle or in a width direction of the vehicle.

According to the embodiment of the seat slide apparatus for the vehicle, the rotational direction of the lock lever 21 and the rotational direction of the operational lever 51 are different from one another.

The seat slide apparatus 1 for the vehicle according to the embodiment includes a pair of the lower rails 3, 3 fixed to the vehicle floor, a pair of the upper rails 4, 4 fixed to the seat and movably connected to the lower rails 3, 3, respectively, a pair of the lock levers 21, 21, which are rotatably connected to the corresponding upper rail 4 at the side of the upper rails 4, 4 which face each other in the width direction of the seat and are engaged with the corresponding lower rail 3, for selectively restricting the movement of the upper rail 4 relative to the lower rail 3, a pair of the support brackets 31, 31 fixed to the corresponding upper rail 4 at the side of the upper rails 4, 4, which face each other in the width direction of the seat, and an operational lever 51 which integrally includes the operational portion 51a extending in the width direction of the seat and a pair of the lever portions (end portions) 51b, 51b which are formed at the both ends of the operational portion 51a to bend in the front-rear direction of the seat, are rotatably connected to the support brackets 31, 31, respectively, and are linked to the lock levers 21, 21, respectively, at the end thereof for transmitting the operational force to the lock levers 21, 21 for canceling the restricted state of the relative movement of the lower rail 3 and the upper rail 4. The seat slide apparatus 1 for the vehicle further includes a pair of the restriction portions 52, 52 which are formed at the opposing sides of the ends of the lever portions (end portions) 51b, 51b in the width direction of the seat and engage with the corresponding lock lever 21 for restricting the displacement of the operational lever 51 in the width direction of the seat. According to the construction of the embodiment, in a case where the operational lever 51 is about to displace in one of the width directions of the seat, the restriction portion 52 of the corresponding lever portion (end portion) 51b is engaged with the lock lever 21 to restrict the displacement of the operational lever 51 in the width direction of the seat. Accordingly, the cancellation of the restricted state of the relative movement of the lower rail 3 and the upper rail 4 by the lock lever 21 in response to the operation of the operational lever 51 is more stably performed.

According to the embodiments, the cushioning member 56, 61, 65 contacts the opposite member (i.e., the lock lever 21 or the pressed portion 52) to restrict the contact between the end portion of the operational lever 51 and the lock lever 21 at the initial stage of the rotational operation of the operational lever 51. Accordingly, even when the operational lever 51 which is elastically retained at the predetermined initial position swings due of the vehicle oscillation, the contact between the end portion of the operational lever 51 and the lock lever 21 is restricted by the cushioning member 56, 61, 65. Thus, the generation of the noise such as hitting sound generated between the operational lever 51 and the lock lever 21 is restrained. In those circumstances, because the cushioning member 56, 61, 65 elastically contacts the opposite member (i.e., the lock lever 21 or the pressed portion 52), the generation of the noise therebetween is restrained. On the other hand, the cushioning member 56, 61, 65 is arranged to allow the contact between the end portion of the operational lever 51 and the lock lever 21 when the restricted state of the relative movement of the lower rail 3 and the upper rail 4 is canceled by the lock lever 21 in accordance with the rotational operation of the operational lever 51. That is, when the lock lever 21 cancels the restricted state of the relative movement of the lower rail 3 and the upper rail 4, at least a part of the operational force is transmitted by the end of the operational lever 51 and the lock lever 21 so as to reduce or cancel the transmission of the operational force between the cushioning member 56, 61, 65 and the opposite member (i.e., the lock lever 21 or the pressed portion 52). Accordingly, even if the cushioning member 56, 61, 65 slidably contacts the opposite member (i.e., the lock lever 21 or the pressed portion 52), for example, when canceling the restriction of the relative movement of the lower rail 3 and the upper rail 4 by the lock lever 21, the deterioration of the cushioning member 56, 61, 65 because of the sliding contact therebetween is restrained, and the reduction of the noise restraining effects when using the seat slide apparatus can be restrained. Further, because the sliding contact between the cushioning member 56, 61, 65 and the lock lever 21 is canceled when the greater force by the rotation of the operational lever 51 is applied so that the operational force is transmitted by the direct contact between the pressed portion 52 and the lock lever 21, the deterioration of the cushioning member 56 is restrained. Here, the state where the cushioning member 56, 61, 65 contacts the lock lever 21 at the initial stage of the rotational operation of the operational lever 51 includes a state that the cushioning member has already been contacted the lock lever 21 when the operational lever 51 is retained by the torsion spring (second biasing member) 41 at the predetermined initial position.

According to the embodiments, each of the lower rail 3, the upper rail 4, the lock lever 21, the first biasing member 22, the second biasing member 41, and the cushioning member 56, 61, 65 are provided at both sides of the seat in a width direction as a pair, and the operational lever 51 integrally includes an operational portion 51a extending in the width direction of the seat and a lever portion 51b provided at each end of the operational portion 51 and bent in a front-rear direction of the seat for transmitting the operational force to the lock lever 21 at the end portion 52.

According to the embodiments, the operational lever 51 includes the integrally formed operational portion 51a and the end portions (lever portions) 51b, 51b and is configured to simultaneously transmit the operational force to the both lock levers 21, 21 for canceling the restricted state of the relative movement of the lower rail 3 and the upper rail 4 by rotating the both end portions (lever portions) 51b, 51b operatively connected to the lock levers 21, 21 in response to the operation of the operational portion 51. Further, in those circumstances, even if one of the pressed portions 52 of the operational lever 51 is in contact with the lock lever 21, there is a possibility that the other pressed portion 52 is not in contact with the lock lever 21 due to the influence of the variations when assembled. Even if one of the pressed portions 52 is not in contact with the lock lever 21, because the cushioning member 56 is provided, higher effects of restraining the noise can be attained both when the operational lever 51 is provisioned at the predetermined initial position and when the operational lever 51 is positioned at the position to unlock the lock levers 21, 21 to cancel the relative movement of the lower rail 3 and the upper rail 4.

According to the embodiments, the seat slide apparatus 1 for the vehicle further includes the restriction portion 52a provided at each end portion 52 of the lever portion 51b at a side facing the opposing end portion 52 of the lever portion 51b. The restriction portion 52a is configured to engage with the lock lever 21 for restricting a displacement of the operational lever 51 in the width direction of the seat.

According to the embodiments, when the operational lever 51 is about to displace to either side of the seat in the width direction, the restriction portion 52a of the corresponding end portion (lever portion) 51b engages with the lock lever 21 to restrict the displacement of the operational lever 51 in the width direction of the seat. Accordingly, the cancellation of the restricted state of the relative movement of the lower rail 3 and the upper rail 4 by the lock lever 21 in response to the operation of the operational lever 51 is more stably performed.

According to the embodiments, the restriction portion 52a is formed by bending a portion of the end portion 52 of the lever portion 51b at the side facing the opposing lever portion 51b to cover opposing sides of the lock levers provided at both sides of the seat in a width direction of the seat.

According to the embodiments, the restriction portion 52a is configured with a simple structure.

According to the embodiments, the seat slide apparatus 1 for the vehicle which stably restrains the noise generated between the operational lever 51 and the lock lever 21 through time is provided.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat slide apparatus for a vehicle, comprising:
a lower rail adapted to be fixed to a vehicle floor;
an upper rail adapted to be fixed to the seat for moving relative to the lower rail;
a lock lever rotatably connected to the upper rail and configured to be engaged with the lower rail for selectively restricting a movement of the upper rail relative to the lower rail;
a first biasing member for elastically retaining the lock lever at a predetermined initial position where the movement of the upper rail relative to the lower rail is restricted;
an operational lever rotatably connected to the upper rail and operationally connected to the lock lever, the operational lever having an end portion which is configured to transmit an operational force of the operational lever to the lock lever for canceling the restriction of the movement of the upper rail relative to the lower rail in response to a rotational operation of the operational lever;
a second biasing member for elastically retaining the operational lever at a predetermined initial position; and
a cushioning member provided at one of the operational lever and the lock lever, the cushioning member being configured to contact the other of the operational lever and the lock lever for restricting a contact of the end portion of the operational lever with the lock lever at an initial stage of the rotational operation of the operational lever and being configured to allow a contact of the end portion of the operational lever with the lock lever when canceling the restriction of the movement of the upper rail relative to the lower rail by the lock lever in response to the rotational operation of the operational lever.

2. The seat slide apparatus for the vehicle according to claim 1, wherein
each of the lower rail, the upper rail, the lock lever, the first biasing member, the second biasing member, and the cushioning member are provided at both sides of the seat in a width direction as a pair; and
the operational lever integrally includes an operational portion extending in the width direction of the seat and a lever portion provided at each end of the operational portion and bent in a front-rear direction of the seat for transmitting the operational force to the lock lever at the end portion.

3. The seat slide apparatus for the vehicle according to claim 2, further comprising:
a restriction portion provided at each end portion of the lever portion at a side facing the opposing end portion of the lever portion, the restriction portion being configured to engage with the lock lever for restricting a displacement of the operational lever in the width direction of the seat.

4. The seat slide apparatus for the vehicle according to claim 3, wherein the restriction portion is formed by bending a portion of the end portion of the lever portion at a side facing the opposing lever portion to cover opposing sides of the lock levers provided at both sides of the seat in a width direction of the seat.

* * * * *